(12) United States Patent
Herrmann et al.

(10) Patent No.: US 11,362,338 B2
(45) Date of Patent: Jun. 14, 2022

(54) ELECTRIC VEHICLE BATTERY CELL WITH SOLID STATE ELECTROLYTE

(71) Applicants: Volkswagen AG, Wolfsburg (DE); AUDI AG, Ingolstadt (DE); Dr. Ing. h.c. F. Porsche AG, Stuttgart (DE)

(72) Inventors: Mirko Herrmann, Mountain View, CA (US); Angela Speidel, Mountain View, CA (US); Rouven Scheffler, Hannover (DE)

(73) Assignees: VOLKSWAGEN AG, Wolfsburg (DE); AUDI AG, Ingolstadt (DE); DR. ING. H.C. F. PORSCHE, Stuttgart (DE)

( * ) Notice: Subject to any disclaimer, the term of this patent is extended or adjusted under 35 U.S.C. 154(b) by 0 days.

(21) Appl. No.: 15/432,328

(22) Filed: Feb. 14, 2017

(65) Prior Publication Data

US 2018/0233752 A1    Aug. 16, 2018

(51) Int. Cl.
*H01M 4/66* (2006.01)
*H01M 10/04* (2006.01)
(Continued)

(52) U.S. Cl.
CPC ............. *H01M 4/667* (2013.01); *B60L 50/64* (2019.02); *H01M 4/661* (2013.01); *H01M 4/662* (2013.01);
(Continued)

(58) Field of Classification Search
None
See application file for complete search history.

(56) References Cited

U.S. PATENT DOCUMENTS

| | | | | |
|---|---|---|---|---|
| 3,819,412 A | * | 6/1974 | Taylor | H01M 4/14 429/210 |
| 4,164,068 A | * | 8/1979 | Shropshire | H01M 6/48 156/73.1 |

(Continued)

FOREIGN PATENT DOCUMENTS

| | | |
|---|---|---|
| CA | 2835915 A1 | 11/2012 |
| CN | 1303525 A | 7/2001 |

(Continued)

OTHER PUBLICATIONS

Definition of fixedly, www.dictionary.com, Oct. 23, 2018 (Year: 2018).*

(Continued)

*Primary Examiner* — Carmen V Lyles-Irving
(74) *Attorney, Agent, or Firm* — Davidson, Davidson & Kappel, LLC

(57) ABSTRACT

A battery component includes a polymer frame having at least one window, the polymer frame having a first planar side and an opposite second planar side, and a window edge between the first and second planar sides. The battery component also has a battery cell component having a separator and bipolar current collector, the battery cell component being attached to the frame, the separator or bipolar current collector being attached to the first planar side or the window edge. A battery stack, a method for handling the battery component as an individual unit are also provided, electric vehicle battery and electric vehicle are also provided.

17 Claims, 6 Drawing Sheets

(51) Int. Cl.
*B60L 50/64* (2019.01)
*H01M 50/10* (2021.01)
*H01M 50/20* (2021.01)
*H01M 50/116* (2021.01)
*H01M 50/155* (2021.01)
*H01M 50/431* (2021.01)
*H01M 4/02* (2006.01)

(52) U.S. Cl.
CPC ....... *H01M 4/664* (2013.01); *H01M 10/0418* (2013.01); *H01M 50/10* (2021.01); *H01M 50/116* (2021.01); *H01M 50/155* (2021.01); *H01M 50/20* (2021.01); *H01M 50/431* (2021.01); *H01M 2004/029* (2013.01); *H01M 2220/20* (2013.01)

(56) References Cited

U.S. PATENT DOCUMENTS

| | | |
|---|---|---|
| 4,539,268 A | 9/1985 | Rowlette et al. |
| 4,576,881 A | 3/1986 | Hasenauer et al. |
| 4,737,257 A | 4/1988 | Boulton |
| 5,518,839 A | 5/1996 | Olsen et al. |
| 5,618,641 A * | 4/1997 | Arias ............. H01M 2/08 29/623.2 |
| 5,688,615 A | 11/1997 | Mrotek et al. |
| 6,022,642 A | 2/2000 | Tsukamoto et al. |
| 6,696,204 B2 | 2/2004 | Sate et al. |
| 6,743,546 B1 | 6/2004 | Kaneda et al. |
| 6,752,842 B2 | 6/2004 | Luski et al. |
| 7,097,937 B2 | 8/2006 | Frederiksson et al. |
| 7,648,538 B2 | 1/2010 | Oogami et al. |
| 7,824,806 B2 | 11/2010 | Visco et al. |
| 8,415,049 B2 | 4/2013 | Shimamura et al. |
| 9,818,996 B2 | 11/2017 | Miyake |
| 10,147,968 B2 | 12/2018 | Visco |
| 2003/0013012 A1 | 1/2003 | Ahn et al. |
| 2003/0041444 A1 | 3/2003 | Debe et al. |
| 2003/0194605 A1 | 10/2003 | Fauteux et al. |
| 2004/0067417 A1 | 4/2004 | Oosawa et al. |
| 2004/0091771 A1 | 5/2004 | Hosaka et al. |
| 2004/0241525 A1 | 12/2004 | Mekala et al. |
| 2004/0253512 A1 | 12/2004 | Watanabe et al. |
| 2005/0089751 A1 | 4/2005 | Oogami et al. |
| 2006/0134502 A1* | 6/2006 | Garceau ............. H01M 8/026 429/434 |
| 2008/0003493 A1 | 1/2008 | Bates et al. |
| 2009/0233164 A1 | 9/2009 | Shimamura |
| 2011/0014520 A1* | 1/2011 | Ueda ............. H01M 2/204 429/210 |
| 2011/0206974 A1 | 8/2011 | Inoue et al. |
| 2011/0217595 A1 | 9/2011 | Kelnberger |
| 2011/0308935 A1 | 12/2011 | Yamazaki et al. |
| 2012/0115020 A1 | 5/2012 | Hwang et al. |
| 2013/0065110 A1 | 3/2013 | Faust |
| 2013/0101878 A1 | 4/2013 | Pilgram |
| 2013/0108899 A1 | 5/2013 | Schaefer |
| 2013/0157111 A1 | 6/2013 | Chami |
| 2013/0162216 A1 | 6/2013 | Zhamu et al. |
| 2013/0302695 A1 | 11/2013 | Beer et al. |
| 2014/0045040 A1 | 2/2014 | Chami et al. |
| 2014/0178745 A1 | 6/2014 | Kwon et al. |
| 2014/0329126 A1 | 11/2014 | Ho et al. |
| 2014/0349147 A1 | 11/2014 | Shaffer, II et al. |
| 2014/0363748 A1 | 12/2014 | Kritzer et al. |
| 2015/0050537 A1* | 2/2015 | Christensen ......... H01M 4/382 429/101 |
| 2015/0093627 A1 | 4/2015 | Busch et al. |
| 2015/0280177 A1 | 10/2015 | Keates |
| 2016/0104913 A1 | 4/2016 | Moreau |
| 2016/0141623 A1 | 5/2016 | Yoon et al. |
| 2016/0329535 A1* | 11/2016 | Moomaw ............. H01M 10/18 |
| 2017/0263951 A1 | 9/2017 | Kanno et al. |
| 2017/0294662 A1 | 10/2017 | Madden et al. |
| 2017/0294672 A1 | 10/2017 | Warrington et al. |
| 2018/0233721 A1 | 8/2018 | Herrmann et al. |
| 2018/0233768 A1 | 8/2018 | Herrmann et al. |
| 2018/0233782 A1 | 8/2018 | Herrmann et al. |
| 2019/0044129 A1 | 2/2019 | Yadav |

FOREIGN PATENT DOCUMENTS

| | | |
|---|---|---|
| CN | 1337757 A | 2/2002 |
| CN | 1499664 A | 5/2004 |
| CN | 1619859 A | 5/2005 |
| CN | 1795575 A | 6/2006 |
| CN | 1912522 | 2/2007 |
| CN | 101076915 | 11/2007 |
| CN | 103334147 | 10/2013 |
| CN | 103443994 A | 12/2013 |
| CN | 103840212 A | 6/2014 |
| CN | 103959507 A | 7/2014 |
| DE | 102010013031 A1 | 9/2011 |
| DE | 102011003186 A1 | 7/2012 |
| DE | 102012213110 A1 | 1/2014 |
| DE | 102015102688 A1 | 10/2015 |
| DE | 102015210806 A1 | 5/2016 |
| EP | 1487034 A2 | 12/2004 |
| EP | 1841001 | 10/2007 |
| EP | 1175709 B1 | 11/2009 |
| EP | 2804697 A1 | 11/2014 |
| EP | 2843734 A2 | 3/2015 |
| GB | 2477552 | 8/2011 |
| JP | 2005-259379 | 9/2005 |
| JP | 2005259379 | 9/2005 |
| JP | 2009117052 A | 5/2009 |
| JP | 2010277811 | 12/2010 |
| KR | 20080036139 A | 4/2008 |
| WO | WO9210861 | 6/1992 |
| WO | WO 1997038461 A1 | 10/1997 |
| WO | WO01/59869 | 8/2001 |
| WO | WO2006061696 | 6/2006 |
| WO | WO2009029746 | 3/2009 |
| WO | WO 2010049478 A1 | 5/2010 |
| WO | WO2010124195 A1 | 10/2010 |
| WO | WO 2011134613 A1 | 11/2011 |
| WO | WO2012/025505 | 3/2012 |
| WO | WO2013109641 | 7/2013 |
| WO | WO 2013131624 A1 | 9/2013 |
| WO | 2609643 B1 | 6/2014 |
| WO | 1766716 B1 | 4/2015 |
| WO | WO2015083825 | 6/2015 |
| WO | WO2016/057457 | 4/2016 |

OTHER PUBLICATIONS

Definition of connected, www.google.com, Oct. 23, 2018 (Year: 2018).*
Search Report of PCT/IB2018/000333, dated Jun. 1, 2018.
Key technologies for electric motorization, downloaded from http://www.toyota-global.com/innovation/environmentaL_technology/keytech/, 5 pages, downloaded on Feb. 14, 2017.

* cited by examiner

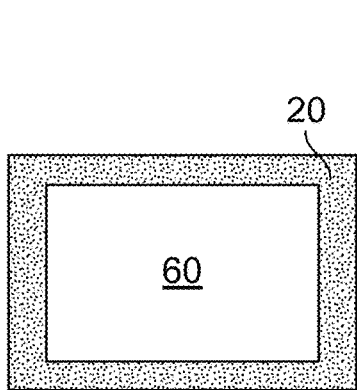
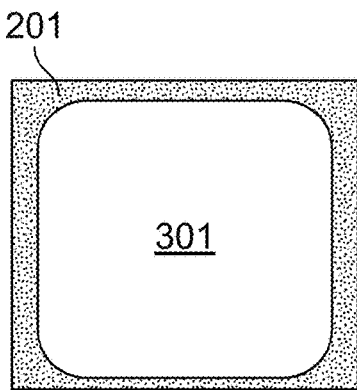
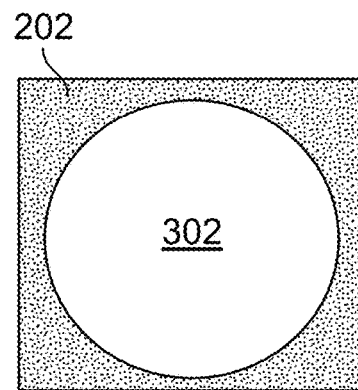
FIG. 4A    FIG. 4B    FIG. 4C
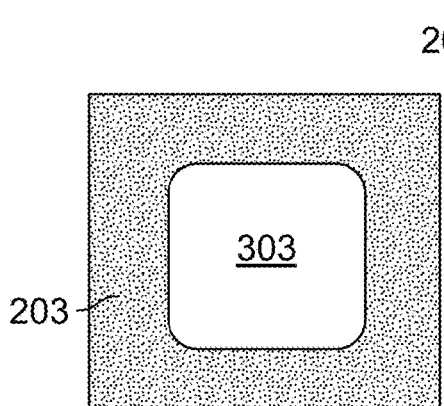
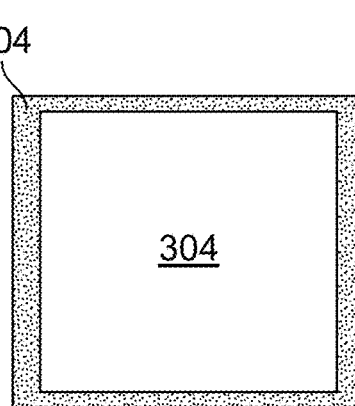
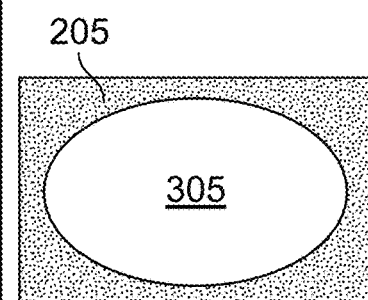
FIG. 4D    FIG. 4E    FIG. 4F
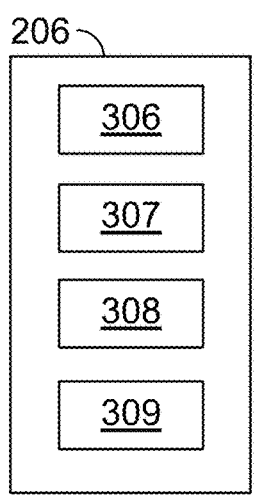
FIG. 4G
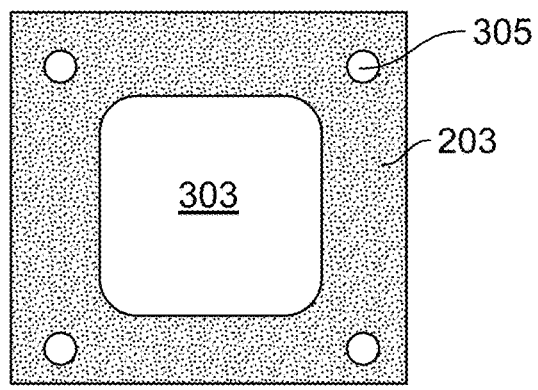
FIG. 5

ELECTRIC VEHICLE BATTERY CELL WITH SOLID STATE ELECTROLYTE

FIELD OF THE INVENTION

The present invention relates generally to electric vehicles and more particularly to batteries for electric vehicles.

BACKGROUND

U.S. Patent Application Publication No. 2013/0157111 discloses a casing for a lithium bipolar electrochemical battery including a bipolar element. The casing includes a composite material including a matrix and at least one porous reinforcement, the matrix of which includes at least one hardened polymer impregnating the at least one porous reinforcement, wherein the at least one porous reinforcement and the at least one hardened polymer encase the bipolar element and maintain a determined pressure on either side of the bipolar element to maintain a determined contact between its constituents. The bipolar element includes lower and upper electrodes separated from a bipolar electrode by two separators, in which an electrolyte is present in a liquid or gel form. Sealing against the electrolytes of the battery between two constituted adjacent electrochemical cells is provided by a seal which is produced by deposition of resin or adhesive on the periphery of all the electrodes.

U.S. Patent Application No. 2013/0101878 discloses a battery comprising a plurality of self-contained, substantially cuboid cell housings, in each of which a side face is formed at least in some regions as a negative pole and the opposite side face is designed at least in some regions as a positive pole. The cell housings bear against one another, with the pole on the pole, and extend between a positive contact and a negative contact, and wherein the cell housings are each enclosed by an electrically non-conductive, mechanically supporting frame. The cell housing is filled with electrolyte on both sides of a bimetal.

U.S. Patent Application No. 2004/0253512 discloses a bipolar battery including a bipolar electrode and an electrolyte layer. The bipolar electrode includes a current collector, a positive electrode layer formed on one surface of the current collector, and a negative electrode layer formed on the other surface of the current collector. The bipolar electrode is sequentially laminated to provide connection in series via the electrolyte layer to form a stack structure. The positive electrode layer, the negative electrode layer and the electrolyte layer are potted with a resin portion. A polymer gel electrolyte can include a solid polymer electrolyte with an ion conductivity.

U.S. Patent Application No. 2003/0013012 discloses an electrochemical element comprising electrochemical cells which are multiply stacked. The electrochemical cells are formed by stacking: i) a bicell having a cathode; a separator layer; an anode; another separator layer; and another cathode sequentially as a basic unit; or ii) a bicell having an anode; a separator layer; a cathode; another separator layer; and another anode sequentially as a basic unit. A separator film is interposed between each of the stacked bicells.

U.S. Patent Application No. 2016/0141623 discloses a bipolar electrode having a solid electrolyte, an anode slurry and a cathode slurry, each of which may be provided on a first surface and a second surface of the solid electrolyte, respectively, spacers provided in the anode slurry and the cathode slurry, and a metal substrate provided on the anode slurry and the cathode slurry. The electrode can be dried and pressed, and stacked to form an all-solid state battery.

http://www.toyota-global.com/innovation/environmental_technology/keytech/ describes some of the advantages of all solid-state batteries.

SUMMARY OF THE INVENTION

The present invention provides a battery unit comprising:
a separator including a solid-state electrolyte;
a bipolar current collector foil;
a cathode deposited as a film on a first side of the bipolar current collector or on the separator; and
an anode.

The present invention advantageously creates a battery unit that is easily stackable, while using a solid-state electrolyte that can create battery cells that are connected internally in series to produce high-voltage battery cells. The battery using a bipolar current collector foil can have a reduced weight and enhanced safety.

The cathode preferably is deposited on the bipolar current collector and the anode preferably is deposited as a film on a second side of the bipolar current collector foil opposite the first side.

The bipolar current collector advantageously can be made of aluminum and coated with nickel, copper or their alloys or carbon. The foil also could be a graphite foil.

The use of aluminum foil, especially coated with nickel, has a great advantage in the present invention, as the thickness of the current collector can be smaller than 15 micrometers, and even 10 micrometers or less. This can lead to large weight and cost reductions.

To support the use of the bipolar current collector foil, the foil can be attached to a polymer frame.

The polymer frame can for example be a rigid structure or a dense foil, perforated foil, porous foil, adhesive tape or adhesive foil, and maybe for example be made of polyethylene, polypropylene or a mixture of the two, and has a window to permit for example a cathode or anode material to extend therethrough.

The bipolar current collector foil can be attached to the frame for example by gluing, welding heat bonding, lamination or adhesive tape. Advantageously, a nickel-coated side of an aluminum bipolar current collector foil can be attached directly to the frame.

The material deposited for the cathode can include such as lithium metal or carbon. The anode material can also be deposited on the bipolar current collector and can be made of similar materials.

The present invention also provides a battery module comprising: a plurality of the battery units described above connected in series, as well as an electric vehicle battery comprising a plurality of the battery modules connected in series or in parallel. An electric vehicle comprising the battery is also provided.

BRIEF DESCRIPTION OF THE DRAWINGS

The following describe several nonlimiting embodiments of the present invention, in which:

FIGS. 4a, 4b, 4c, 4d, 4e and 4f show various frame geometries of the polymer frame according to the present invention, and FIG. 4g shows a frame with a plurality of windows.

FIG. 5 shows a polymer frame according to the present invention with feed holes for easing assembly;

DETAILED DESCRIPTION OF THE PREFERRED EMBODIMENTS

Figure 1:
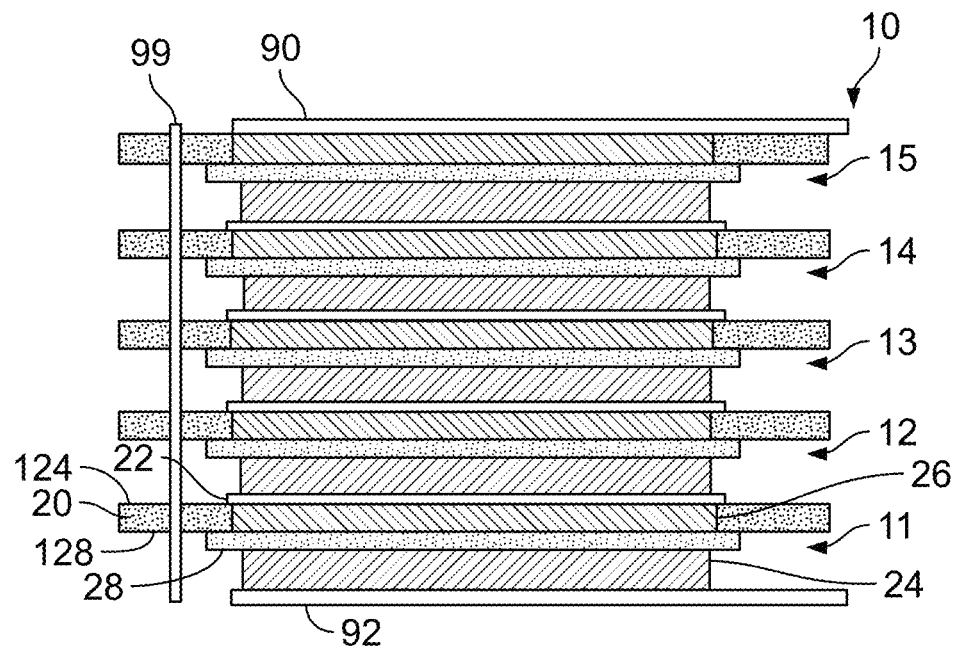
FIG. 1 shows a side view of a plurality of stacked battery components in a first embodiment of the present invention.

FIG. 1 shows a battery cell module 10 with five stackable battery components 11, 12, 13, 14, 15 having electrode components according to an embodiment of the present invention.

Each battery component 11, 12, 13, 14, 15 includes an anode 24, a separator 28, a cathode 26 and a bipolar current collector 22. Each component also includes a polymer frame 20, which on a planar side 124 has the bipolar current collector 22 and on an opposite planar side 128 has the separator 28. Polymer frame 20 in this embodiment is a polymer foil, and the attachment of separator 28 to frame 20 will be described in more detail with respect to FIGS. 3a, 3b and 3c.

Polymer frame 20 can be made for example of polypropylene (PP), polyethylene (PE), acrylnitrile butadiene-styrene (ABS), polyamide (PA), polylactic acid (PLA), poly (methyl methacrylate) (PMMA), polycarbonate (PC), polyethylene terephthalate (PET), polystyrene (PS), polyvinyl chloride (PVC), polyphenylene sulfide (PPS), polyphenylene oxide (PPO), Polyetherimide (PEI), polyether ether ketone (PEEK), polyether sulfone (PES), polybenzimidazole (PM), nylon and composite foil or multilayer foil made of aluminum foil coated with a polymer for example polypropylene. Most preferably, the polymer frame is a PE/PP mixture.

The present invention uses solid-state electrolytes like lithium oxide or sulfide glasses or glass ceramics or ceramics as separator 28. Liquid or gel electrolytes thus advantageously can be dispensed with, and the polymer frame can provide support for the more fragile separator material. Bipolar current collector 22 can be made of copper or aluminum or nickel-coated aluminum or nickel for example. Anode 24 and cathode 26 can be deposited for example by vapor deposition or other film technology on bipolar current collector 22.

Figure 2:
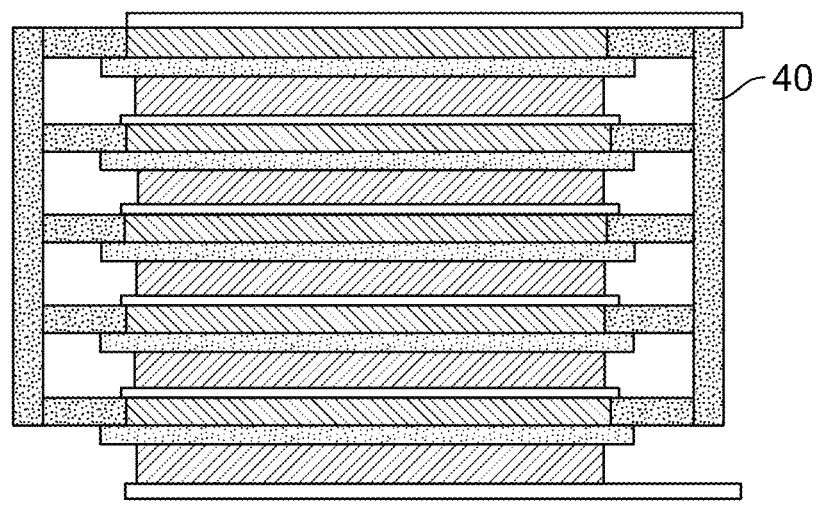
FIG. 2 shows a side view of the embodiment of FIG. 1 with a housing connected to the polymer frames of the battery components to form a battery module cell.

FIG. 2 shows a side view of the embodiment of FIG. 1 with a housing 40 connected to the polymer frames 20 of the battery components 11 to 15 to form a battery module cell. The housing can have for example four walls to cover each side of polymer frames 20, which preferably have a rectangular outer shape.

Housing 40 may be made of the same material as polymer frames 20 for example, or of a different polymer material.

A rod 99 as shown in FIG. 1 can interact with feed holes in the polymer frames 20 as will be described, and can be removed after the stack is created and the housing is added.

Figure 3A:
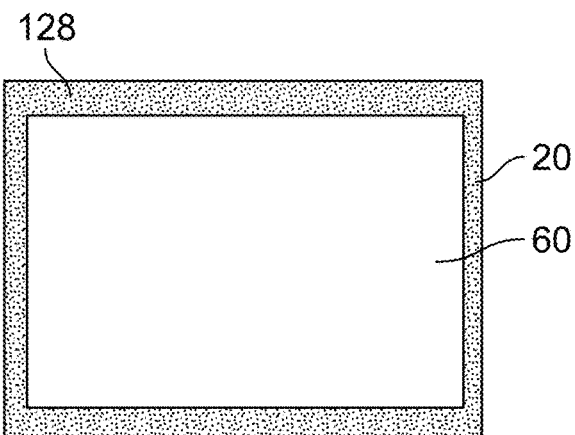
FIGS. 3a, 3b, 3c show a top view of creation of the embodiment of the battery component of the present invention.
Figure 3B:
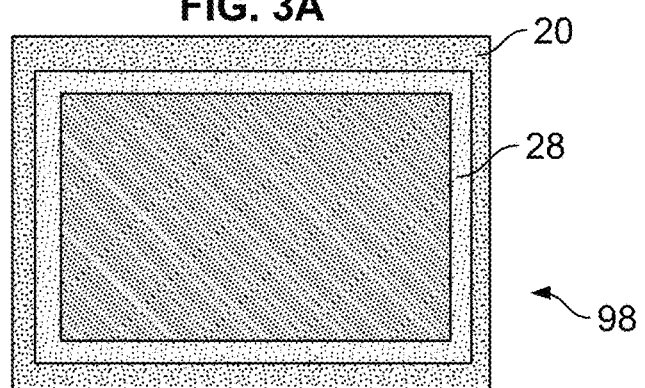
Figure 3C:
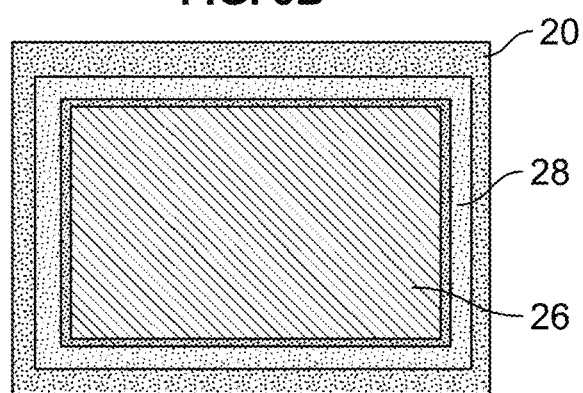
Figure 3D:
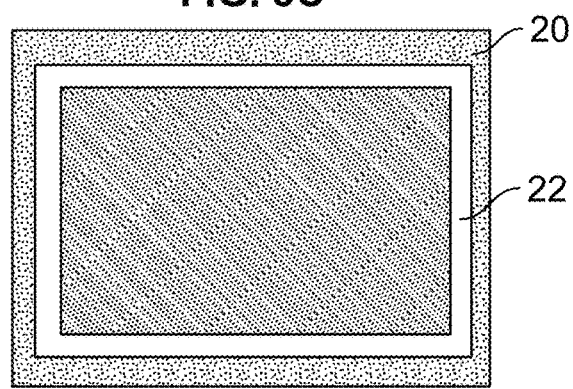
FIG. 3d shows an alternate embodiment of the battery component.

FIGS. 3a, 3b and 3c show a top view of creation of the embodiment of the battery component of the present invention, and FIG. 3d shows an alternate battery component with the bipolar current collector 22 first connected to the polymer frame.

FIG. 3a shows a side 128 of a polymer frame 20 with a rectangular window 60.

As shown in FIG. 3b, frame 20 can be placed over separator 28, which can have an anode 24 on one side and cathode 26 on the other side as shown in FIG. 1. Cathode 26 protrudes through window 60, as shown in FIG. 3c. Bipolar current collector 22, which can be a thin metal foil, then can be added over cathode 26 and attached to the frame 20 at its edges. Frame 20 likewise is attached to separator 28 around window 60.

Frame 20 and separator 28, fixedly connected, thus create an easily stackable battery component 98. Bipolar current collector 22, anode 24 and cathode 26 can be connected to this stackable component as discussed above or also can added separately or later during assembly.

The anode and the cathode advantageously can be made of polymer, glass, glassceramic or ceramic solid-state materials, and the mechanical properties are improved and much of the mechanical stress during the cell assembly process can be retained by the polymer frame, which lowers the requirements on the assembly process. In addition, small imperfections at the solid-state material edges can be tolerated and the amount of defective goods can be decreased.

FIG. 3d shows an alternate embodiment which starts out with the same frame 20 as in FIG. 3a. Bipolar current collector 22, which can be a thin foil of aluminum coated with nickel, is placed nickel side down on the frame to overlap side 128. Gluing or other bonding can be used to attach the nickel coating to a PP/PE frame, which advantageously provides a stable connection compares to a PP/PE aluminum or copper connection. The thin foil of the current collector 22 is also stabilized well, and then the cathode 26, separator 28 and anode 24 can be added separately to the combined frame 20/current collector 22 component.

FIGS. 4a, 4b, 4c, 4d, 4e and 4f show various frame geometries of the polymer frames according to the present invention, with FIG. 4a being similar to FIG. 3a, and frames 201, 202, 203, 204, 205 having a window 301 with rounded edges, a circular window 302, a window 303 similar to window 301 but smaller for a same outer sized frame, a perfectly square window 304 and an oval window 305, respectively.

FIG. 4g shows a polymer frame 206 with for example four windows 306, 307, 308, 309.

FIG. 5 shows a polymer frame 203 according to the present invention with feed holes 305 for easing assembly.

Assembly of the FIG. 1 embodiment can occur as follows: endplate anode current collector 92 is provided, and then battery component 11 is added so that frame 20 is slid over rod 99 via a feed hole 305. Polymer frame 20 can be slid over further rods via feed holes 305. Components 12, 13, 14 and 15 then can be stacked over the rod 99 as shown in FIG. 1, and finally cathode top plate 90 added to create the battery module 10. The anode 24 of a battery component 12, 13, 14, 15 thus can rest on the bipolar current collector 22 of the battery component 11, 12, 13, 14, respectively, below.

To create the FIG. 2 embodiment the rod 99 can be removed and housing 40 sides can be added and attached to the polymer frames.

Figure 6:
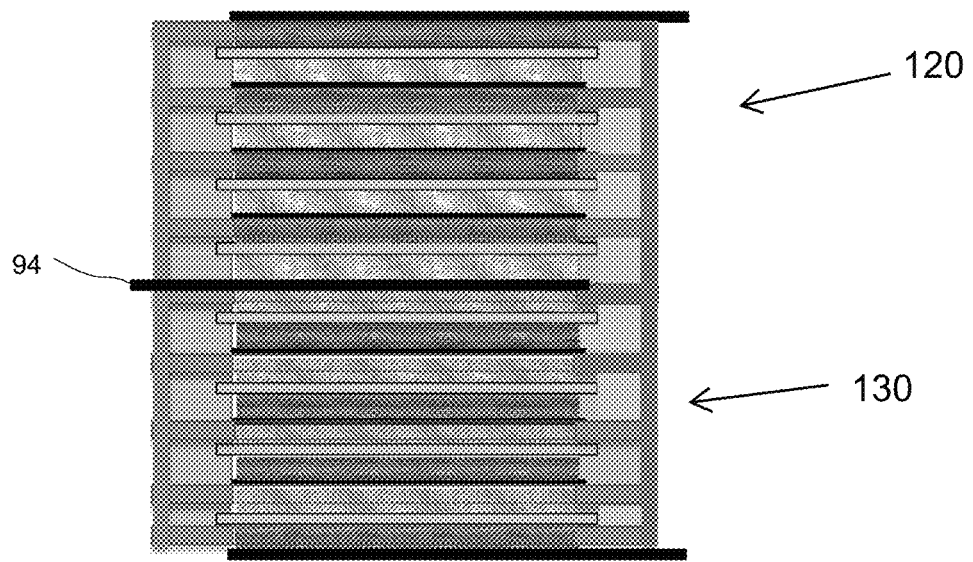
FIG. 6 shows two modules connected in parallel via a middle plate.

FIG. 6 shows a battery with two modules, the top module 120 being similar to module 10 but having a plate or tab at the anode side extending in a different lateral direction, this plate being a so-called middle plate 94. The bottom frame of top module 120 can be omitted. The bottom module 130 can simply be the inverse, with an anode extending through a window contacting the middle plate 94 and the frames bonded together with the middle plate or tab 94 extending, preferably on a side opposite the cathode end plates. As an alternative, the end plates can be anode end plates and the cathode can extend in the middle.

Different battery modules with different endplate configurations advantageously can be created, and then connected in series or in parallel to create different battery capacities or voltages. Specifically, a battery module with simply one endplate at an end of the housing, either a cathode or anode endplate, can be created, identified herein as a module EP, the endplate preferably extending laterally past the housing. For parallel connection with such a module EP, a so-called module EMP with one endplate and one middle plate connector, extending laterally from another side of the housing as the endplate, can be created. A module MP with solely one middle plate and no other endplate, and a module TMP with two middle plates can also be created. These modules, EP, EMP, MP and TMP can be combined in series or parallel to create different battery capacities and voltages. The bipolar current collectors can weld together, as can the frames at the connections.

FIG. 6 thus shows a EMP/EP combination.

Figure 7:
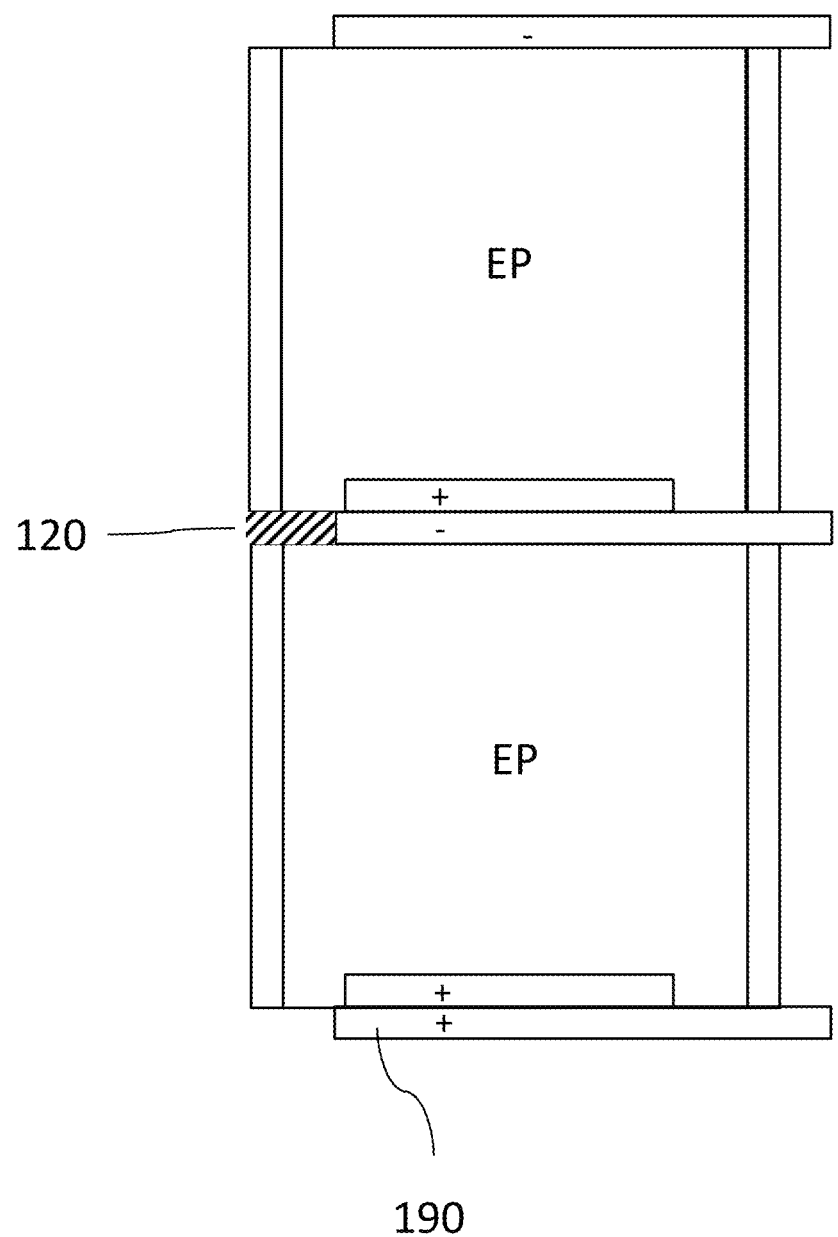
FIG. 7 shows schematically two modules connected in series.

FIG. 7 for example shows two modules EP in series with the frame bonded at a weld 210, and an extra end plate 190 to create a higher voltage battery.

Figure 8:
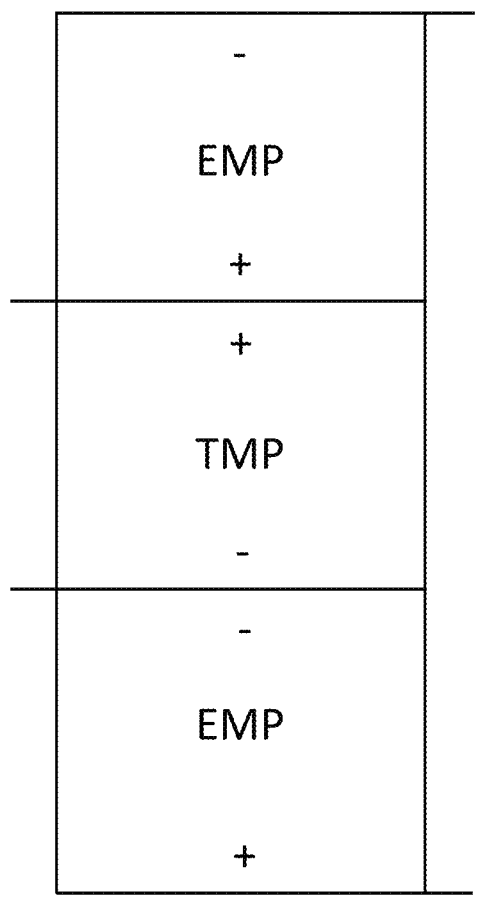
FIG. 8 shows three modules connected in a further configuration.

FIG. 8 shows schematically a further battery configuration with two EP modules and a TMP module in the middle. Other configurations such as EP/MP/EMP or EP/MP/TMP/EP are also possible.

Figure 9:
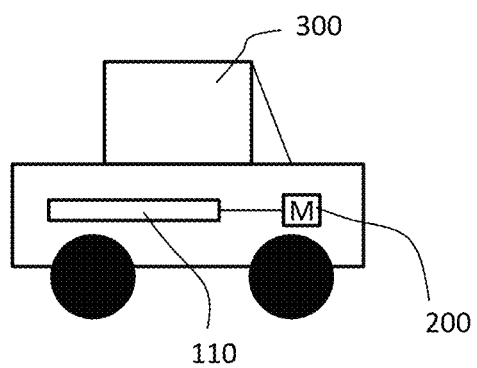
FIG. 9 shows schematically an electric or hybrid vehicle with an electric battery made of the battery module cells.

As shown in FIG. 9, in one application, the battery cell module or stack 110 can be created for example with a much larger number of battery cells for providing power as an electric battery to an electric motor 200 for powering an electric vehicle 300.

By using the bipolar current collector foil with the solid state separator material as above, several advantages result. In electric and hybrid vehicles, the external wiring of the cells is sophisticated and expensive. For example, the battery pack of s prior art eGolf consists of 22 modules with each 12 cells. The weight of the electrical wires and cell connectors contributes significantly to the cell weight and the costs of the battery pack. The weight and the costs depends strongly on the amount of current. Increasing voltage via an internal series connection as in the present invention, without wiring, helps to reduce the amount of copper wires/connectors. Also, the internal series connection of electrodes without wiring as in the present invention allows to build cells with very different voltages. Cells with nominal voltages around 12 volts, 24 volts, 48 volts up to 800 volts are preferred. These cells then can be connected in parallel or in series as desired, as described above.

Even pure aluminum foil can used as bipolar current collector material. The bipolar current collector is thinner than in a conventional lithium-ion battery and parallel connection of electrodes internally leads to cost and weight reduction due to use of Al current collectors and less tabs in the cell.

Further, solid-state lithium cells also allow for the usage of aluminum foil as anode current collector foil, which may not be possible for conventional lithium ion cells due to lithium intercalation reaction into the aluminum, which causes cracking and corrosion of the aluminum.

While with a solid-electrolyte (ceramic or polymer) there may be a surface reaction with the aluminum, without of a liquid phase present, no Al3+ will or can be dissolve and migrate to the cathode. For even better corrosion prevention, carbon or nickel coated aluminum foil may be advantageous as the material for the current collector bipolar plate. In the prior art, a small short circuit between cathode and anode can has a big impact on the battery cell and its module. If one cell in a 4 series/3 parallel module-system, like the eGolf module, has a short circuit failure, a series of four battery cells will cut off; the result is a capacity loss of 33.3%. The remaining eight cells receive a 50% higher stress. The likelihood of the faster aging of this module is much high. A module-failure then would lead to a complete battery-system failure because all modules are serial connected.

In the present invention, the battery can be made of a couple up to hundreds of small battery cells. For example, a module cell is made of 140 cells of 10*15 cm electrode size, with 3.7 V per cell gives 518 V as the module cell voltage with a capacity of 0.45 Ah, and has similar energy to a classic 63 Ah, 3.7 V cell. However, the module cells are the parallel-connected cells, for example one module cell in serial and 12 in parallel. The same failure (short circuit of anode and cathode) in this battery would lead to a capacity loss of just 0.71% and in the case of a failure of a whole module, a capacity loss of 8.3%. Another advantage is that all module cells are parallel connected so that even if several malfunction, there is a loss in the battery capacity but never a shutdown of the whole battery-system.

The present invention also enhances the manufacturing speed of high-voltage and ultra-high-voltage modules with additionally supporting the high-voltage and ultra-high-voltage module cells to get more shock/vibration resistance for the use in a horizontal or vertical battery position.

The frame-supported separators do not just increase the speed of stacking the single battery cells to a module cell, further those frames can be used for fixing the stack (module cell) for transport and build/assemble modules faster. After stacking all single battery cells can, with the help of the frames, be glued, welded or laminated together without moving the stack. This stabilizes the stack/module cell; all cells remain their positions; immediately without moving the stack into an extra cell housing.

Depending of the module the bunch of module cells can assembled without internal wiring, this can be achieved with double-coated electrode (only with anode or cathode material). This double-coated electrode or middle plate has the function of an "end plate" for two module cells and this middle plate connect both module cells with each other. This reduces the assembling time by stacking the module cells to a module also the internal wiring. The production time for a module will be decrease.

A further advantage of the sealed module cell is the flexible polymer-frame, which stabilizes the each single battery cell and reduces the vibration force by absorbing energy through swinging. With the polymer frame, each fragile separator has its own suspension to lower the vibration/shock force.

What is claimed is:

1. A battery unit comprising:
   a polymer frame having a first planar frame side and a second planar frame side opposite to and parallel to the first planar frame side;
   a separator including a solid-state electrolyte, the separator fixedly connected to the polymer frame at the first planar frame side, a planar surface of the separator contacting the polymer frame at the first planar frame side;

a bipolar current collector foil connected to the polymer frame at the second planar frame side, a planar surface of the bipolar current collector foil contacting the polymer frame at the second planar frame side;

a cathode deposited as a film on a first side of the bipolar current collector foil or on the separator; and an anode, wherein the polymer frame has an outer shape and a window is defined within the outer shape, the separator being fixedly connected to the polymer frame at the first planar frame side at edges of the separator around the window, the bipolar current collector foil connected to the polymer frame at the second planar frame side at edges of the bipolar current collector foil around the window.

2. The battery unit as recited in claim 1 wherein the cathode is deposited on the bipolar current collector foil.

3. The battery unit as recited in claim 2 wherein the anode is deposited as a film on a second side of the bipolar current collector foil opposite the first side.

4. The battery unit as recited in claim 1 wherein the bipolar current collector foil includes aluminum.

5. The battery unit as recited in claim 4 wherein the bipolar current collector foil is coated with nickel, copper or their alloys or carbon.

6. The battery unit as recited in claim 1 wherein a thickness of the bipolar current collector foil is smaller than 10 micrometers.

7. The battery unit as recited in claim 1 wherein the bipolar current collector foil is attached to the polymer frame by gluing, welding, heat bonding, lamination or adhesive tape.

8. The battery unit as recited in claim 7 wherein the bipolar current collector foil is made of aluminum foil coated with nickel, and the nickel is attached directly to the frame.

9. The battery unit as recited in claim 1 wherein the separator is made of lithium oxide or sulfide glasses or glass ceramics or ceramics.

10. A battery module comprising: a plurality of the battery units as recited in claim 1 connected in series.

11. An electric vehicle battery comprising a plurality of the battery modules as recited in claim 10, connected in series or in parallel.

12. An electric vehicle comprising the battery as recited in claim 11.

13. A method for assembling a battery component comprising stacking a plurality of battery units as recited in claim 1.

14. The battery unit as recited in claim 1 wherein the polymer frame has an outer perimeter and an inner perimeter defining the window, the first planar frame side and the second planar frame side each extending from the outer perimeter to the inner perimeter.

15. The battery module as recited in claim 10 further comprising a housing connected to the outer perimeters of the polymer frames.

16. The battery module as recited in claim 15 wherein planar surfaces of the polymer frames adjacent to the outer perimeters are each spaced from adjacent polymer frames by gaps.

17. The battery module as recited in claim 16 wherein the housing has four walls covering each side of the outer perimeters of the polymer frames, which have a rectangular outer shape.

* * * * *